United States Patent [19]

Christ et al.

[11] Patent Number: 5,052,231
[45] Date of Patent: Oct. 1, 1991

[54] MASS FLOW GAUGE FOR FLOWING MEDIA WITH DEVICES FOR DETERMINATION OF THE CORIOLIS FORCE

[75] Inventors: Herbert Christ, Reutlingen, Fed. Rep. of Germany; Mike Kellaway, Cambridge, United Kingdom; Wolfgang Stumm, Reutlingen, Fed. Rep. of Germany

[73] Assignee: Rheometron AG, Basel, Switzerland

[21] Appl. No.: 458,848

[22] Filed: Dec. 29, 1989

Related U.S. Application Data

[63] Continuation-in-part of Ser. No. 195,201, May 19, 1988, abandoned.

[51] Int. Cl.$^5$ .............................................. G01F 1/84
[52] U.S. Cl. .................................................. 73/861.38
[58] Field of Search .......................... 73/861.37, 861.38

[56] References Cited

U.S. PATENT DOCUMENTS 4,782,711 11/1988 Pratt .................................. 73/861.38
4,934,196  6/1990 Romano ........................... 73/861.38

Primary Examiner—Herbert Goldstein
Attorney, Agent, or Firm—Cesari and McKenna

[57] ABSTRACT

In a Coriolis mass flow gauge, the signal from each sensor is digitized and converted into digital measuring values by one or more analog/digital converters operating with a specific digital sampling frequency. Then, using a microcomputer, each digital measuring value thus obtained is multiplied, on the one hand, with the sine value of the phase angle at the point of sampling of the alternating signal or another scanning signal with the same frequency as the alternating voltage signal, but phase-shifted against that signal and, on the other hand, with the corresponding cosine value. The sine-multiplication values thus obtained are summed over a predetermined time interval to form one Cartesian coordinate of a corresponding sum vector, whereas the cosine multiplication values thus obtained are summed over that time interval to form the other Cartesian coordinate of the sum vector, and from the Cartesian coordinates of the sum vectors of both lateral sensors, the measuring value describing the mass flow through the loop is calculated directly.

11 Claims, 4 Drawing Sheets

MASS FLOW GAUGE FOR FLOWING MEDIA WITH DEVICES FOR DETERMINATION OF THE CORIOLIS FORCE

RELATED APPLICATION

This application is a continuation-in-part of Ser. No. 195,201, filed May 19, 1988 now abandoned.

The invention relates to a mass flow gauge for flowing media with devices for determination of the Coriolis force.

BACKGROUND OF THE INVENTION

For the measuring of the mass flow of a flowing medium there are known instruments which determine a Coriolis force acting upon the flowing medium. This force is an inertial force which acts in addition to the centrifugal force upon a mass point which moves in a reference system that is moved as such on a circular path. A measuring instrument suitable for flowing media can consists, for example, of an oscillatory U-shape tube loop whose in- and out-flow ends are clamped in a massive pillow block. When this U-shaped tube loop is vibrated at its arc end in a direction vertical to the plane of the tube loop, the Coriolis forces of the through-flowing medium acting on the two legs of the U-shaped tube loop cause to-and-fro distortions of the U-shaped tube loop around an axis which lies centrally between the two legs and parallel to them. The extent of these distortions is determined by means of suitable sensors which are arranged in the region of the two legs and from whose measuring signals the flow amount is calculated. Such a device is known, for example, from U.S. Pat. No. 4,187,721 and exhibits a U-shaped tube and a T-shaped leaf spring which forms the arms of a tuning fork. The T-shaped leaf spring carries at its free end a vibration generator which acts upon the freely oscillating end of the U-shaped tube so that the U-shaped tube and the leaf spring oscillate in opposite directions with a characteristic frequency like a tuning fork. From DE-Patent 2 822 087 it is known to provide two U-shaped tube loops through which the medium flows consecutively in the same direction in order to augment the sensitivity of the gauge. The vibration generator is mounted at the free end of the U-shaped tube loops and the sensors measuring the distortions are affixed to the two U-shaped tubes. Of a similar design are the constructions described in DE-A 2 938 498, DE-A 3 007 361 and DE-A 3 046 793.

On the aforementioned constructions are employed sensors such as light switches or the like, which trigger switching signals when the mechanically sensor parts are passing the zero position. In an electric circuit the time difference between the zero crossings of the lateral sensors is determined. This time difference is directly proportional to the mass flow of the medium flowing through the U-shaped tube loop. EP-A 0 083 144 shows the use of sensors which transform the mechanical vibrations into analogous sinusoidal measuring signals from which is likewise determined, by means of an electronic switch, a time difference proportional to the mass flow.

These prior constructions are not frequency-selective. Superposed interfering signals from turbulences in the fluid flow or movement of the tube line can strongly disturb the sinusoidal course and thereby the measuring of the time displacement between the zero crossings. The employment of electronic filters in the two signal channels is generally not a solution to this problem because the time or phase displacements are very small (of the order of a few microseconds) and can be strongly falsified, e.g. by varying thermal drifts of the two filters. Finally, because of the relatively low oscillation-frequencies employed (i.e. between 60 and 100 Hz) and only two measurements that may be taken per period, this result is a maximum of about 200 measurements per second and therefore, the information content of the measuring signals not fully utilized.

SUMMARY OF THE INVENTION

Above explained disadvantages are eliminated with a mass flow gauge for flowing media with devices for determination of the Coriolis force, comprising at least one tube loop, which is fixed with its two legs to a massive pillow block, an exciting means coupled to said tube loop to mechanically oscillate said tube loop with a predetermined exciting frequency in a direction approximately vertical to the plane defined by the tube loop, a lateral sensor at each leg of said tube loop which converts the mechanical oscillations of the tube loop into an analogous electric alternating voltage signal, and a dual channel electronic circuit arrangement, which forms out of the alternating voltage signals of both lateral sensors a measuring signal that is proportional to the mass flow through said tube loop characterized in that, the alternating voltage signal of each lateral sensor—each channel—is digitized and converted into digital measuring values by analog/digital-converting means operating with a specific digital sampling frequency, then, by means of a microcomputer, each digital measuring values thus obtained is multiplied on the one hand with the sine-value of the phase-angle at the point of sampling of the alternating voltage signal or another scanning signal with the same frequency as the alternating voltage signal, but phase-shifted against said alternating voltage signal, and on the other hand with the corresponding cosine-value, the sine-multiplication-values thus obtained are summed up over a predetermined time interval to form one Cartesian coordinate of a corresponding sum-vector, whereas the cosine-multiplication-values thus obtained are summed up over said time interval to form the other Cartesian coordinate of said sum-vector, and from the Cartesian coordinates of the sum-vectors of both lateral sensors the measuring value describing the mass flow is directly calculated.

This mass flow gauge has the advantage that, instead of any time differences, the Cartesian components of the measuring-signal vectors are determined and evaluated. The instrument allows a strongly frequency selective evaluation for the suppression of external disturbances as well as a direct determination of the signals caused by the Coriolis force. Measured are the sinusoidal oscillations of the tube loop which are based on the oscillations caused by the exciting means, but are modified by the forces resulting from the mass flow, which are phase-shifted by $+90°$ in one leg of the tube loop and by $-90°$ in the other leg of the tube loop due to the Coriolis accelerations.

From the corresponding sine-like alternating voltage signals generated by the two lateral sensors, there are sampled at a specified digital sampling frequency the momentary voltage values. The microcomputer supplies for this a sampling frequency which is about a multiple of the frequency of the alternating voltage signal. After sampling over e.g. one complete period ($2\pi$) in both channels and doing the multiplication and summing operations described, there are available four sum values from which the Coriolis force can be obtained.

For example, the digital measuring values within the predetermined period of time are multiplied with the sine-values of the phase-angle at the specific sampling-point of the alternating voltage signal that comes from the lateral sensor of the left leg of the loop to obtain the x-component of the corresponding sum-vector. At the same sampling points, also the cosine-values are used for multiplication with the actually measured values to obtain the y-component of the corresponding sum-vector. The same mathematical operation is done with the digital measuring values obtained from the alternating voltage signal of the lateral sensor attached to the right leg of the tube loop. As a result, altogether four values are obtained that have to be summed up over a predetermined time interval to represent the Cartesian coordinates of both sum-vectors. The measuring value describing the mass flow may be easily calculated from those Cartesian coordinates as further explained below.

Of course, it is not absolutely necessary that the phase-angle at the point of sampling, from which the sine-value and the cosine-value is obtained, is the phase-angle of the alternating voltage signal as such. It is sufficient that it is a phase-angle of any scanning signal with the same frequency as the alternating voltage signal. Such other scanning frequency might be phase-shifted against said alternating voltage signal.

Therefore in view of the explanation of this invention one has to differ precisely between the sampling frequency which in the end just gives the number of sampling points within a predetermined time interval, preferably one full period of the alternating voltage signal, and the scanning frequency which in fact is the frequency of the alternating voltage signal or the identical frequency of the other scanning signal. The scanning frequency only forms the basis to calculate the specific phase-angle at each point of sampling.

The frequency selectivity of the method increases considerably with the rising number of periods which are being taken into account in calculation. It is therefore recommended to select for the evaluation a time interval which comprises several full periods of the alternating voltage signal. In order not to repeatedly multiply within a time interval, the microcomputer controls the sensing so that the multiplication values already stored within a given time interval are continuously supplemented on each sampling by corresponding new multiplication values and the corresponding, oldest stored multiplication values are subtracted.

All measured values lying within the time interval remain in the sum-values, the newly sampled values are added to the sum and the values leaving the interval are subtracted. Also, instead of individual measuring values, groups of successive measuring values can be used in the manner described, the microcomputer multiplies those signal groups of each channel with the corresponding sine- and cosine-values.

The microcomputer further derives the frequency of the scanning signal roughly from the frequency of the measuring values and suitably readjusts the scanning frequency according to the results of the calculations during the whole measuring process, so that changes of the frequency of the alternating voltage signals due to density changes of the measured medium, can be taken into account.

The conversion of the alternating voltage signals into digital measuring values can be accomplished with the aid of different structural components. A particularly advantageous design provides that the analog/digital converting means of each channel comprises a sample-and-hold amplifier and an analog to digital converter and the amplitudes of the alternating voltage signal at identical time points are continuously picked up by said sample-and-hold amplifier and are converted by means of said analog to digital converter into said digital measuring values. To eliminate disturbing frequencies, the sampling frequency should be selected to be as high as possible. However, this is limited by the capacity of economically suitable microcomputers. Therefore the two channels of alternating voltage signals, each amplified by means of an input amplifier, may be connected through an anti-aliasing filter to the respective sample, and, hold amplifier.

For the compensation of possible differences between the two channels supplying the alternating voltage signals, a microcomputer-controlled channel changeover is provided which feeds the two alternating voltage signals in defined time intervals alternately, i.e. crosswise, to the processing channels. Within the microcomputer, however, the alternated signals are again reassigned to the original channels.

The outputs of the sample, and, hold amplifiers may be connected via a multiplexer to the analog to digital converter so that the signals of the two signal channels are alternatingly fed into only one analog to digital converter. The output of the analog to digital converter can further be connected to the microcomputer via a buffer memory (first in, first out=FIFO).

A conversion of the electric alternating voltage signals into digital measured values can be accomplished in accordance with another embodiment in that in each channel a comparator compares the alternating voltage signals with the output voltage of a digital to analog converter and switches the counting direction input of a binary synchronous counter whose counter reading on one hand forms the binary input valve of the digital to analog converter and on the other hand is fed to the microcomputer. For this purpose, the counting direction input of the binary synchronous counter is preferably connected via a multiplexer to the comparators and the output of the binary synchronous counter is connected via a buffer memory to the microcomputer.

BRIEF DESCRIPTION OF THE DRAWINGS

Preferred embodiments of the invention are shown in the drawings by way of examples only.

DESCRIPTION OF THE PREFERRED EMBODIMENTS

Figure 1:
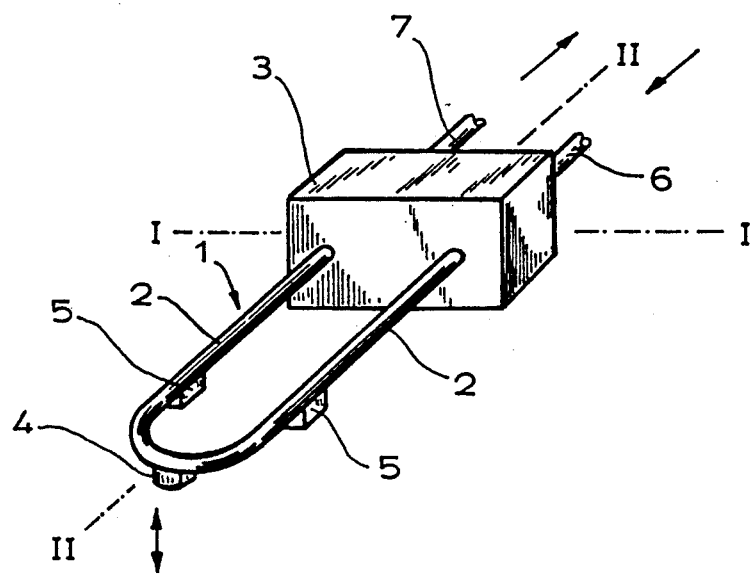
FIG. 1 shows, greatly simplified, a mass flow gauge in a perspective presentation.

The instrument represented diagrammatically in FIG. 1 serves for the measuring of the through-flow of flowing media. It consists of a U-shaped tube loop 1, whose legs 2 are attached to a massive pillow block 3. At the opposite side of the pillow block 3 is provided an inflow end 6 and an outflow end 7. These two ends are connected to a pipe-like (not shown) through which flows the medium to be measured so that the medium flows through the tube loop 1. The U-shaped tube loop 1 can be set into oscillation with a predetermined exciting frequency by an exciting means that has the form of a driver 4; the oscillations run vertical to the plane defined by the tube loop 1. The driver 4 may be, for example, an electromagnet and is best arranged at the outer end of the tube loop 1.

At each leg 2 there is affixed a lateral sensor 5 which picks up the mechanical oscillations of the tube loop 1 and converts them into analogous electric alternating voltage signals. When no medium flows through the tube loop 1, then it oscillates primarily around the axis I, but as soon as a medium flows through the tube loop 1 additional Coriolis forces arise which twist the tube loop 1 at the beat of the oscillations around the axis II. The extent of the distortion is greatest at the highest speed of the oscillatory motions. The extent of this distortion is determined by means of the lateral sensors 5 from whose alternating voltage signals the amount of throughflow in tube loop 1 can be determined. Thus measured are the oscillations caused by the driver 4 modified by the influence of the Coriolis acceleration. The Coriolis forces, however, are phase-shifted by $+90°$ or $-90°$ in the two legs 2 respectively.

For an explanation of the mode of operation, the depiction in FIG. 1 of a measuring instrument with a U-shaped tube loop 1 has been greatly schematized. Such a measuring instrument may, however, be built up in different ways, and can, for example, also have two oppositely oscillating tube loops. The circuit arrangement described herein is suitable for all mass flow gauges with vibrating tube loops for determination of the Coriolis force.

Figure 2:
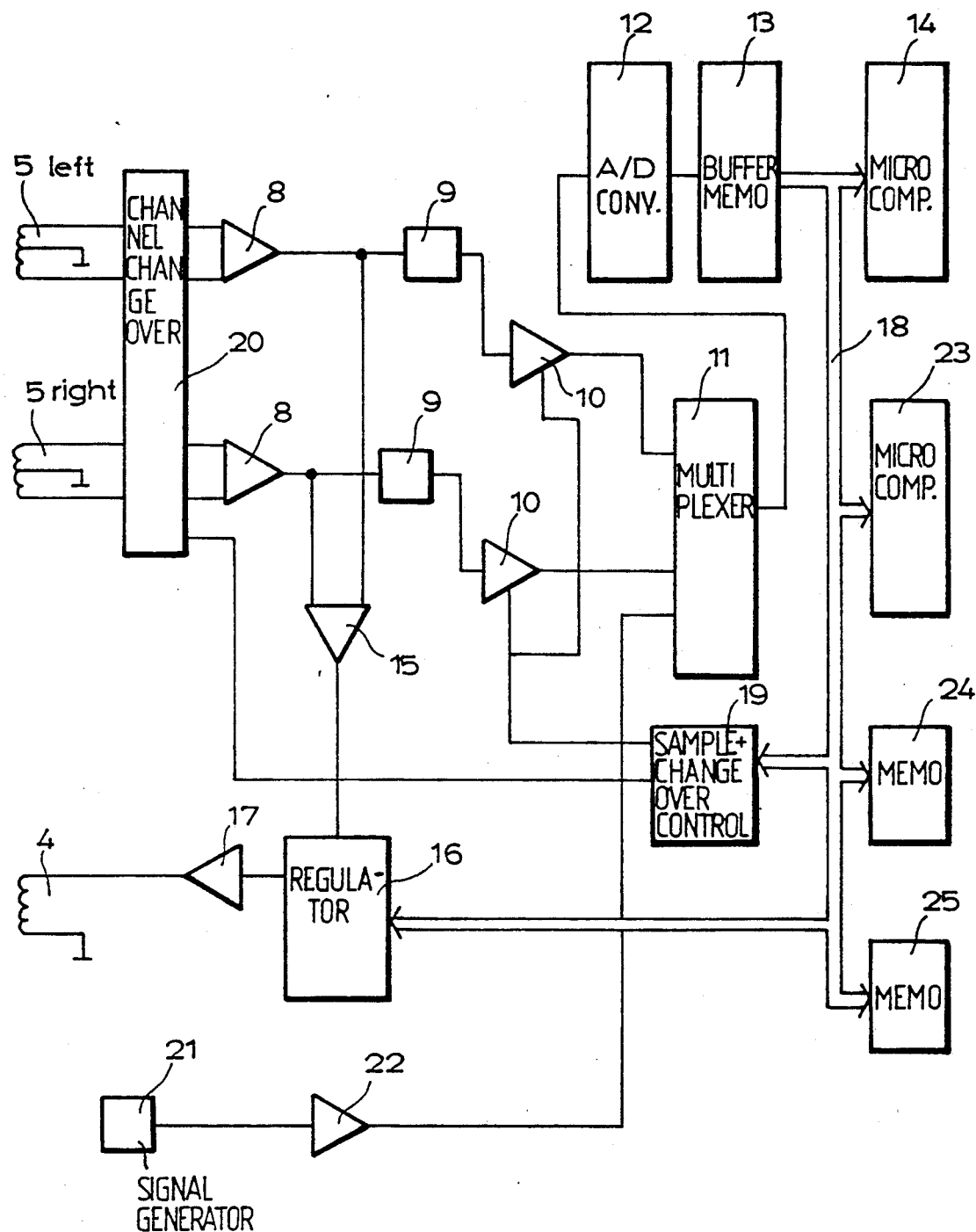
FIG. 2 is a block diagram showing a circuit arrangement for processing of the electric alternating voltage signals of the FIG. 1 gauge.

The circuit arrangement depicted in FIG. 2 as an illustrative examples serves for the sampling and processing of the measuring signals generated by the sensors 5 of the FIG. 1 gauge. Each sensor 5 generates an electric alternating voltage signal with a sinusoidal waveform of fixed frequency which waveform reflects the influence of the Coriolis forces. Correspondingly there exists a left and a right signal channel. Each alternating voltage signal is fed via an input amplifier 8 and an anti-aliasing filter 9 to a sample-and-hold amplifier 10. These apply their output-signals via a multiplexer 11 to an analog to digital converter 12, the multiplexer 11 receiving its control signals from a signal generator 21 through an amplifier 22.

The digitized measuring values are fed via a buffer memory (first in, first out=FIFO) 13 to a microcomputer 14 which executes the evaluation and carries out various control functions and to which may be assigned additional electronic components, such as, e.g., an additional microprocessor 23, an optional program memory 24 and a measured value memory 25.

Figure 3:
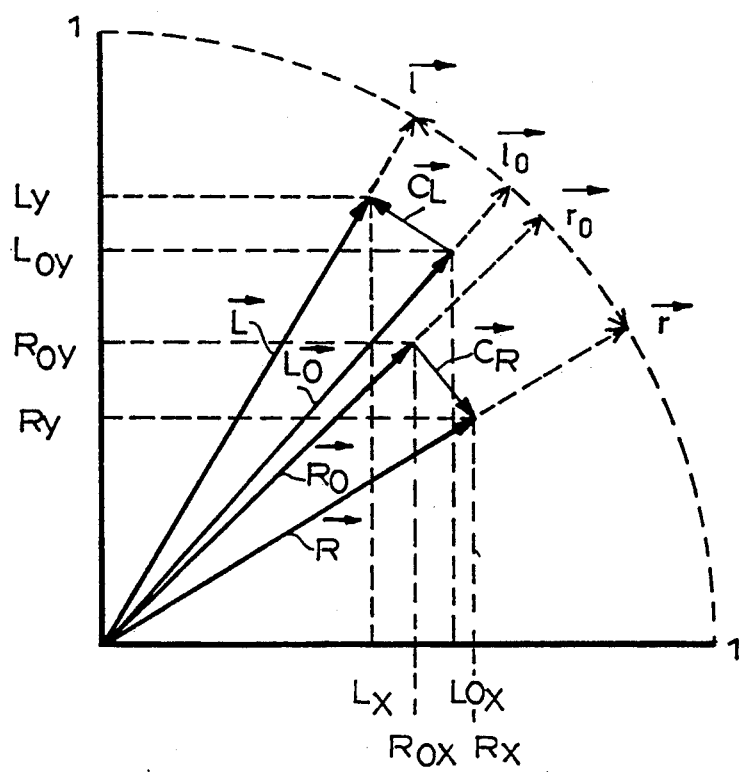
FIG. 3 is a vector diagram of the measured signals.

FIG. 3 shows the sinusoidal alternating voltage signals in a vector representation. When no medium flows through the tube loop 1, then the signal of the left sensor 5 is represented by the vector $L_o$, whereas the signal of the right sensor 5 is represented by the vector $R_o$. As a rule these two signals vary from each other, because of different sensitivities, geometric deviations in the tube loop 1, etc.. In FIG. 3, those deviations are shown enlarged. Upon occurrence of a mass flow, the vectors $C_L$, $C_R$ corresponding to the Coriolis motions occur. At the left leg 2, the additional vector $C_L$ shows a $+90°$ shift, whereas the right leg 2, the additional vector $C_R$ shows a $-90°$ shift. Actually measured are the signals corresponding to the sum vectors $\vec{L}$ or $\vec{R}$ respectively.

In the prior art measuring instruments, the angle between the sum vectors $\vec{L}$ and $\vec{R}$ is determined by counting out the time difference between the zero crossing of the corresponding signal trains. In accordance with the present invention, however, the Cartesion vector components $L_x$, $L_y$, $R_x$, $R_y$ of the sum vectors $\vec{L}$ and $\vec{R}$ are extracted by above-explained multiplication with the sine- and the cosine-values of the phase-angles at the points of sampling of the alternating voltage signal or another scanning signal with the same frequency as the alternating voltage signal, and then evaluated in a microcomputer 14. This kind of mathematical operation is the same as is usually done with a digital Fourier analysis, although only the basic frequency and no harmonics of this frequency are used, as is conventionally done with the Fourier analysis.

The evaluation obtained can be explained with the aid of the following mathematical reflection:

In the equations (1) through (13) given below the terms used are defined as follows:

$\vec{l}$ vector l (unit vector, absolute value 1)
$\vec{L}$ vector L
$\vec{r}$ vector r (unit vector, absolute value 1)
$\vec{R}$ vector R
$\vec{M}$ vector M
$\vec{A}$ vector A
$|\vec{L}|$ absolute value of vector L
$|\vec{R}|$ absolute value of vector R
$\vec{l}\,\vec{r}$ scalar product of vectors l and r
$\vec{A}\,\vec{M}$ scalar product of vectors A and M
$\vec{l}+\vec{r}$ sum vector of vectors l and r
$(\vec{l}+\vec{r})_\perp$ vector being oriented perpendicular to the sum vector $\vec{l}+\vec{r}$
$L_x$, $L_y$ vector $\vec{L}$ in cartesian coordinates of a two dimensional system
$R_x$, $R_y$ vector $\vec{R}$ in cartesian coordinates of a two dimensional system
(x, y) a vector with the cartesian coordinates "x" and "y"
(x, y) (w, z) scalar product of two vectors written in cartesian coordinates
u v normal product of two scalars (no multiplication sign used in this notation, because the sign "x" is reserved for vectorial multiplication of two vectors)

The measuring vector $\vec{M}$ is formed by the difference between the left and right unit vector $\vec{l}-\vec{r}$ with $$l = \frac{L}{|L|} \quad r = \frac{R}{|R|} \quad M = l - r \tag{1}$$

The measuring value describing the mass throughflow can be obtained from the measuring vector $\vec{M}$ by scalar multiplication of the measuring vector $\vec{M}$ with a unit vector $\vec{A}$ which is perpendicular to the mean value of the two measuring unit vectors $\vec{l}$ and $\vec{r}$. The evaluation vector $\vec{A}$ has the form:

$$A = \frac{1}{l'r} \quad \frac{1}{2}(l+r)\perp \tag{2}$$

Thus the measured value is:

$$M = A \, M \tag{3}$$

Actually measured are the not normalized sum vectors as explained above:

$$L=(L_x, L_y) \text{ and } R=(R_x, R_y) \tag{4}$$

From this there result the normalized vectors $$l = \frac{L}{|L|} = \left( \frac{L_x}{\sqrt{L_x^2 + L_y^2}}, \frac{L_y}{\sqrt{L_x^2 + L_y^2}} \right) \tag{5}$$

$$r = \frac{R}{|R|} = \left( \frac{R_x}{\sqrt{R_x^2 + R_y^2}}, \frac{R_y}{\sqrt{R_x^2 + R_y^2}} \right) \tag{6}$$

which, with the abbreviations $$l' = \frac{L_y}{L_x} \quad r' = \frac{R_y}{R_x} \tag{7}$$

$$u = \frac{1}{\sqrt{1 + l'^2}} \quad v = \frac{1}{\sqrt{1 + r'^2}} \tag{8}$$

become $$l=(u, ul') \quad r=(v, vr') \tag{9}$$

Thus the evaluation vector $\vec{A}$ has the form:

$$A = \frac{1}{uv + ul'vr'} \quad \frac{1}{2}(-L_y - R_y, L_x + R_x) \tag{10}$$

From this, the evaluation vector may be expressed as:

$$A = \frac{1}{uv(1 + l'r')} \quad \frac{1}{2}(+ul' - vr', u + v) \tag{11}$$

with this evaluation the measured value $M = \vec{A} \, \vec{M}$ becomes $$M = \frac{1}{uv(1 + l'r')} \quad \frac{1}{2}(-ul' - vr', u + v)(u - v, ul' - vr') \tag{12}$$

$$M = \frac{l' - r'}{1 + l'r'} \tag{13}$$

As one can see in equation (7) the terms l and r in equation (13) are nothing else but the quotients of the Cartesian components of the sum vectors of the two lateral sensors. The measured value characterizing the mass flow through the tube loop 1 is easily described by the Cartesian coordinates which are gained through above-explained multiplication process (said one step Fourier analysis).

The value $M_o$ decisive for the zero throughflow is determined by the same mathematical expression and is subtracted on measuring from the actual measured values M.

The momentary voltage ratings of the alternating voltage signals are sampled with a specific sampling frequency over a determined time interval. To exclude disturbances, the sampling frequency should be as high as possible; however, the function of the analog to digital converters and the capacity of the microcomputer do set frequency limits. A suitable sampling frequency can lie, for example, at 32 samples per period of the alternating voltage signals. When the frequency of the alternating voltage signals amounts to, e.g. 100 Hz, then in each channel 3200 samples per second are obtained. Other sampling frequencies can be selected which, however, should always amount to a multiple of the frequency of the alternating voltage signals (see FIG. 4). Storage should cover at least one, preferably a larger number of periods of the alternating voltage signals.

Figure 4:
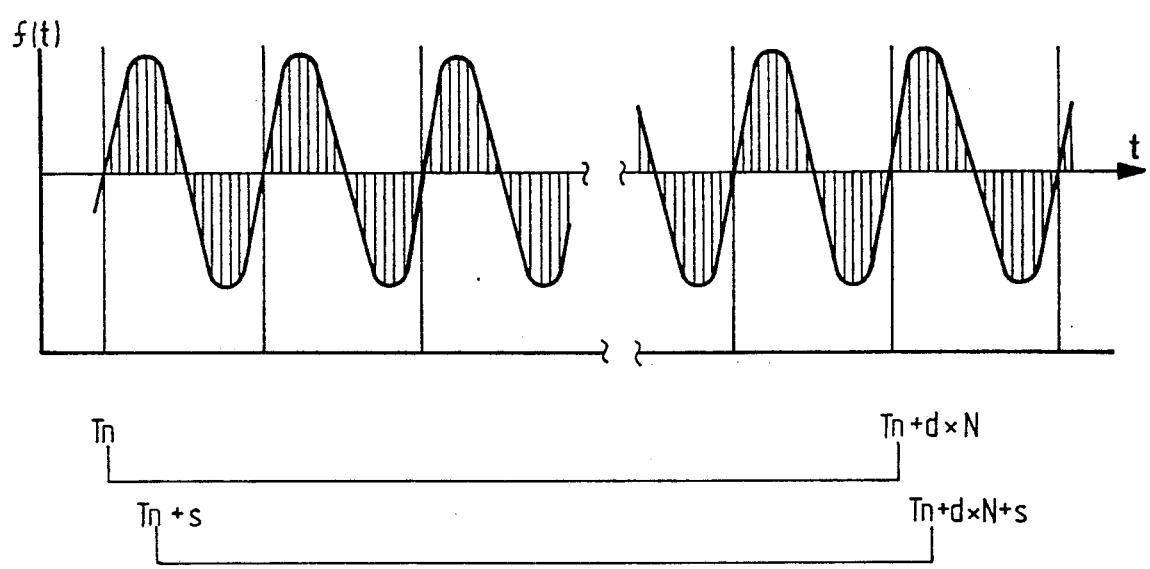
FIG. 4 shows a sampling operation on a signal train.

FIG. 4 shows a scanning signal amplitude relative to time t of a scanning signal f (t) with the same frequency as the alternating voltage signal. This scanning signal might be in phase with the alternating voltage signal or it might be phase-shifted against said alternating voltage signal. Indicated are the sampling points defined by the specific digital sampling frequency of the analog/digital converting means (vertical black lines).

The time interval T used for sampling is covering more than one full period of the scanning signal (or the alternating voltage signal), it is indicated below between $T_n$ and $T_{n+d \times N}$. The starting point of the sampling-window is the sample n, whereas the width of the window is the number of samples per period or time interval N multiplied with the number of time intervals d. Therefore, at the end of the window we have the time T corresponding to sample (n+d×N). Below the window is shifted by one sample s to the right in that the digital measuring value of the new sample is added and the digital measuring value of the first sample is subtracted from the sum stored in the sample-and-hold circuit.

To obtain a faster sequence of measured values, the microcomputer 14 controls the sampling in such a manner that the multiplication values of each channel stored within the given time interval on each sampling are continuously supplemented by a new multiplication value, whereas the oldest stored multiplication value is subtracted. The microcomputer 14 also controls the sample-and-hold amplifiers 10 correspondingly.

According to this method, the measured signal maintains its phase position within the predetermined sampling window, while the window itself moves forward over the alternating voltage signal or any other frequency-related scanning signal with each new sampling step (FIG. 4).

Alternatively, the relative phase of the measured signal can be gradually moved along with the window upon each new sampling value, i.e. to each new measured value is assigned the phase-angle zero. In this case, the sum of all multiplication values has to be corrected on each sampling in correspondence with the new phase position against the reference system. As, however, on phase-angle zero each new digital measuring value is multiplied with cos (0)=1 and sin (0)=0, only these multiplication values have to be added or subtracted at the end of the window.

As a protection against disturbance frequencies, there is connected between the input amplifiers 8 and the sample-and-hold amplifiers 10 in each channel an antialiasing filter 9 whose cut-off frequency lies in the range of the Nyquist-frequency, i.e. in the aforementioned example, at about 2 kHz.

The microcomputer 14 is selected so that it processes the numerical values supplied by the analog to digital converter 12 via the buffer storage 13 and calculates from these the required measured value 11 of the Coriolis force. An associated microprocessor 23 converts the raw values as required into display signals or control signals.

To compensate an additional phase shift of the alternating voltage signals at the input as a result of temperature changes, ageing of the components or the like, the two channels are equipped with a channel changeover 20 controlled by the microcomputer 14. The control is executed by means of the scanning and changeover control 19 which is connected via bus 18 to the microcomputer 14. The microcomputer 14, which controls the changeover, takes into account in the evaluation whether the measuring signal comes from the left or right channel and re-assignes its channel correctly.

The outputs of the sample-and-hold amplifiers 10 are connected via a multiplexer 11 to the analog to digital converter 12 to permit an alternating input of the two channel signals. The buffer memory 13 interposed between the analog to digital converter 12 and the microprocessor 14 makes available to the microprocessor 14 task-free time for calculation operations.

The circuitry is so designed that the driver 4 is controlled through feedback from the alternating voltage signals. For this, a digital amplitude regulator 16 is provided whose input is connected via an amplifier 15 to the two channels of the alternating voltage signals and which forms an average value. The digital set point of the amplitude is given by the microprocessor 14 as a function of the measured value. The output of the digital amplitude regulator 16 is applied via an operational amplifier 17 to the driver 4. Alternatively, an analog control is possible.

The circuitry provided in FIG. 2 can be modified regarding the conversion of the alternating voltage signals. For example, each sample-and-hold amplifier 10 can be connected to the microprocessor 14 via its own analog to digital converter. Even differential amplifiers which couple back via a digital/analog converter may be used.

Figure 5:
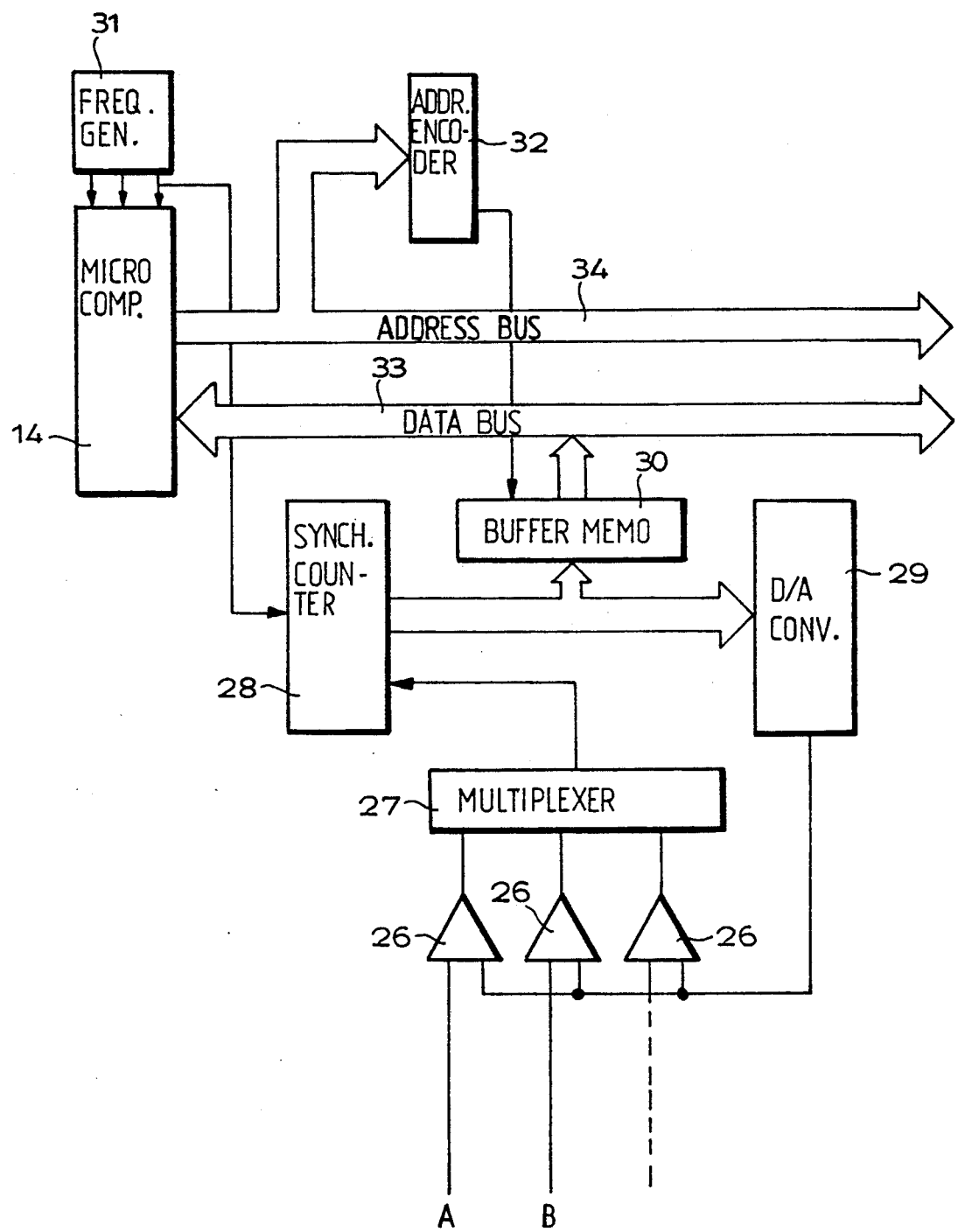
FIG. 5 is a block diagram of another circuit arrangement for processing of the electric alternating voltage signals of the FIG. 1 gauge.

With the circuitry illustrated in FIG. 5, the sample-and-hold amplifiers can be dispensed with. In this arrangement, the alternating voltage signals are, in each case, fed to a comparator 26 which compares these with the output voltage of a digital to analog converter 29. The comparators 26 switch, via a multiplexer 27, the counting direction input of a binary synchronous counter 28 whose counter reading forms the binary input value of the digital to analog converter 29. In this example, a 12 bit synchronous counter 28 is clocked by means of a frequency generator 31.

If the alternating voltage signals are greater than the output voltage of the digital to analog converter 29, then the synchronous counter 28 counts forward, otherwise it counts backwards. As soon as the measuring system is adjusted, the least significant bit of the synchronous counter 28 alternately switches forward and backward. The synchronous counter 28 is connected via a buffer memory 30 to the microprocessor 14.

The FIG. 5 circuitry may also include a data bus 33 and an encoder 32 which receive data from microprocessor 14 through an address bus 34 and delivers address codes to buffer memory 30.

We claim:

1. A Coriolis mass flow gauge of the type including at least one tube loop having fixed legs and through which a fluid can flow, exciting means coupled to said loop to mechanically oscillate the loop at a selected frequency in a direction approximately perpendicular to the nominal plane of the loop, a lateral sensor at each leg of the loop which converts the oscillations of the loop into an analogous alternating voltage signal, and a dual channel electronic circuit which receives in separate channels the alternating signals from the sensors and produces an output that is proportional to the fluid mass flow through the loop, said gauge comprising:
    sampling means for producing a digital sampling signal having a selected frequency;
    converter means responsive to said sampling signal for converting the sensor signal in each channel into digital measuring values;
    processor means for multiplying each digital measuring value from the converter means, on the one hand, with the sine value of the phase angle at the point of sampling of the alternating voltage signal or another signal having the same frequency, but phase-shifted relative to said alternating voltage signal, and, on the other hand, with the corresponding cosine value of said phase angle;
    means for storing said sine and cosine multiplication values;
    means for summing
    (1) the stored sine multiplication values over a predetermined time interval to form one Cartesian coordinate of a corresponding sum-vector, and
    (2) the stored cosine multiplication values thus obtained over the same time interval to form another Cartesian coordinate of said sum vector, and
    means for calculating from said Cartesian coordinates of the sum vectors of both sensor signals the fluid mass flow through the loop.

2. The gauge defined in claim 1 wherein the frequency of the sampling signal is a multiple of the frequency of the alternating voltage signals.

3. The gauge defined in claim 1 and further including means for controlling the sampling and storing means so that the multiplication values corresponding to each sensor signal stored within said predetermined tine interval on each sampling are supplemented continuously by a new multiplication value, while the oldest stored multiplication value is subtracted.

4. The gauge defined in claim 1 wherein the converting means comprise for each sensor signal
    a sample and hold amplifier for continuously picking up and amplifying said alternating voltage signals at identical time points, and
    an analog-to-digital converter for converting the amplified signals into digital measuring values.

5. The gauge defined in claim 4 and further including an input amplifier and an anti-aliasing filter in circuit between each sensor and said analog to digital converter.

6. The gauge defined in claim 4 and further including a multiplexer connected between said sample and hold amplifiers and said analog-to-digital converter so that the same analog-to-digital converter converts the signals from both sensors.

7. The gauge defined in claim 1 and further including means for periodically switching the sensor signals between the two channels of the dual channel electronic circuit.

8. The gauge defined in claim 1 and further including a buffer memory connected between the analog/digital converting means and the processing means.

9. The gauge defined in claim 1 and further including
a digital-to-analog converter;
a binary synchronous counter;
means for applying the binary output of said counter to said analog-to-digital converter and to said processing means, and
means for comparing the alternating voltage signals in each channel of the dual channel electronic circuit with the output of the digital-to-analog converter and switching the counting direction of said counter in response to said signals.

10. The gauge defined in claim 9 and further including a multiplexer in circuit between the comparing means and the counter.

11. The gauge defined in claim 9 and further including a buffer memory in circuit between said counter and said processing means.

* * * * *